US012096210B2

(12) United States Patent
Salomon et al.

(10) Patent No.: US 12,096,210 B2
(45) Date of Patent: Sep. 17, 2024

(54) SYSTEM FOR OPERATING A WASTE CONTAINER AND METHOD FOR TRANSFERRING DATA FROM A WASTE CONTAINER

(71) Applicant: emz-Hanauer GmbH & Co. KGaA, Nabburg (DE)

(72) Inventors: Alexander Salomon, Pfreimd (DE); Raoul Janssen, Schwandorf (DE); Gabi Hahn, Schwandorf (DE); Johannes Lindner, Pfreimd (DE); Michael Schmid, Riedlingen (DE); Andreas Söldner, Rieden (DE)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 1105 days.

(21) Appl. No.: 16/718,623

(22) Filed: Dec. 18, 2019

(65) Prior Publication Data
US 2020/0204994 A1 Jun. 25, 2020

(30) Foreign Application Priority Data
Dec. 21, 2018 (EP) .................................... 18215015

(51) Int. Cl.
*H04W 12/06* (2021.01)
*B65F 1/14* (2006.01)
(Continued)

(52) U.S. Cl.
CPC ........... *H04W 12/06* (2013.01); *B65F 1/1484* (2013.01); *G06Q 10/30* (2013.01); *H04W 84/12* (2013.01); *B65F 2210/128* (2013.01)

(58) Field of Classification Search
CPC ............. Y02W 90/00; B65F 2210/128; B65F 2210/138; B65F 1/1484; B65F 1/14;
(Continued)

(56) References Cited

U.S. PATENT DOCUMENTS 352,887 A * 11/1886 Potter ..................... B62B 17/02
280/28
5,565,846 A 10/1996 Geiszler et al.
(Continued)

FOREIGN PATENT DOCUMENTS

CN 106892231 6/2017
DE 102008005119 9/2008
(Continued)

OTHER PUBLICATIONS

Joshi, Jetendra, et al. "SmartGarbage Monitoring System." Proceedings of the 7th International Conference on Computing Communication and Networking Technologies. 2016. (Year: 2016).*
(Continued)

Primary Examiner — Nathan A Mitchell
(74) Attorney, Agent, or Firm — Sheridan Ross P.C.

(57) ABSTRACT

The present invention relates to a system for operating a waste container comprising a waste container which has an electronic control device, a first communication interface for transmitting and receiving data and a storage device, and a server which is remote from the waste container and has a second communication interface, wherein usage data can be stored in the storage device by the control device after use of the waste container, wherein the first communication interface has no device for direct data transmission to the second communication interface, wherein an indirect first data transfer between the first communication interface and the second communication interface and/or between the second communication interface and the first communication interface can be initiated via at least one further communication interface, which is provided in a further communication device, which is not associated with the waste container, wherein the stored usage data are transferable via the first data transfer to the server.

17 Claims, 3 Drawing Sheets

(51) Int. Cl.
*G06Q 10/30* (2023.01)
*H04W 84/12* (2009.01)

(58) Field of Classification Search
CPC ............ G07C 9/00571; G07C 9/00896; G07C 2009/0092; H04W 84/12; H04W 12/06; G06Q 10/30; G06Q 10/00; G06Q 20/3223; G06Q 20/02; G06Q 20/204; G06Q 20/208; G06Q 20/3221; G06Q 20/3274; G06Q 20/40145; G06Q 20/4037; G06Q 20/202; G06Q 20/24; G06Q 20/3267; G06Q 20/351; G06Q 20/363; G06Q 20/4012; G06Q 20/4033; G06Q 20/3278; G06Q 50/26; G06T 7/001; G06T 7/008; G06N 20/10; G06N 3/08; G06K 9/00624
USPC .................................................. 705/308, 17
See application file for complete search history.

(56) References Cited

U.S. PATENT DOCUMENTS

| | | | |
|---|---|---|---|
| 6,448,898 | B1 | 9/2002 | Kasik |
| 7,311,207 | B2* | 12/2007 | Mallett ................... G06Q 10/30 206/366 |
| 7,511,611 | B2* | 3/2009 | Sabino .................. B65F 1/1484 340/8.1 |
| 8,606,596 | B1* | 12/2013 | Bochenko .............. G06Q 10/00 705/2 |
| 8,994,546 | B2* | 3/2015 | Breed .................... B65D 90/48 342/44 |
| 9,378,489 | B2* | 6/2016 | Åkerblom .............. G06Q 10/30 |
| 9,847,020 | B2* | 12/2017 | Davis ................. G07C 9/00174 |
| 9,902,539 | B2* | 2/2018 | Poss ..................... B65F 1/0033 |
| 10,106,319 | B2* | 10/2018 | Adam ................... B65F 1/1415 |
| 10,271,696 | B2* | 4/2019 | Thom .................. B01D 35/153 |
| 10,955,284 | B2* | 3/2021 | Balachandran ........ G01G 17/00 |
| 10,977,622 | B2* | 4/2021 | Borowski .............. G06Q 90/00 |
| 11,074,556 | B2* | 7/2021 | Kekalainen ............ H04W 4/38 |
| 11,315,085 | B2* | 4/2022 | Candel ..................... B65F 3/02 |
| 2002/0108507 | A1* | 8/2002 | May ..................... B65F 1/1638 700/229 |
| 2005/0228682 | A1* | 10/2005 | Firestone, III ..... G06Q 10/0832 705/308 |
| 2009/0146838 | A1* | 6/2009 | Katz ....................... H04B 7/155 370/310 |
| 2010/0312601 | A1 | 12/2010 | Lin |
| 2011/0035604 | A1* | 2/2011 | Habraken .............. G07F 7/1016 235/382 |
| 2011/0062230 | A1* | 3/2011 | Ward, II ................ G06Q 30/04 705/13 |
| 2011/0116899 | A1* | 5/2011 | Dickens ............... G01G 19/083 414/21 |
| 2012/0217156 | A1* | 8/2012 | Nakazawa ................ C25B 9/23 204/258 |
| 2013/0087562 | A1 | 4/2013 | Thukral et al. |
| 2014/0208813 | A1 | 7/2014 | Reeb |
| 2014/0239059 | A1 | 8/2014 | Flood et al. |
| 2014/0278630 | A1* | 9/2014 | Gates ................... G06Q 10/047 705/7.13 |
| 2014/0340197 | A1 | 11/2014 | Flood |
| 2014/0347166 | A1* | 11/2014 | kerblom ................ B65F 1/1484 235/375 |
| 2015/0102941 | A1* | 4/2015 | Keech ................ H04B 7/15514 340/870.02 |
| 2015/0298903 | A1 | 10/2015 | Luxford |
| 2015/0307273 | A1 | 10/2015 | Lyman |
| 2015/0348252 | A1* | 12/2015 | Mask ..................... G06T 7/001 382/103 |
| 2017/0052052 | A1 | 2/2017 | Gwon et al. |
| 2017/0211969 | A1* | 7/2017 | Waite .................... B30B 9/3046 |
| 2018/0028770 | A1* | 2/2018 | Parrish ................. A61B 5/6824 |
| 2020/0204995 | A1 | 6/2020 | Salomon et al. |
| 2021/0188541 | A1* | 6/2021 | Kurani ..................... B65F 1/14 |

FOREIGN PATENT DOCUMENTS

| | | | |
|---|---|---|---|
| EP | 0698567 | 2/1996 | |
| EP | 1818281 | 8/2007 | |
| EP | 2377779 | 10/2011 | |
| EP | 2377779 A1 * | 10/2011 | ............... B65F 1/10 |
| EP | 2974984 | 1/2016 | |
| EP | 3125201 | 2/2017 | |
| EP | 3321215 | 5/2018 | |
| FR | 2930665 | 10/2009 | |
| JP | 2005-008339 | 1/2005 | |
| JP | 2006-155645 | 6/2006 | |
| KR | 10-2010-0092854 | 8/2010 | |
| WO | WO 2017/216755 | 12/2017 | |

OTHER PUBLICATIONS

Crisnapat, Padma Nyoman, et al. "STTS: IoT-based Smart Trash Tracking System for Dumpsters Monitoring using Web Technology." Journal of Physics: Conference Series. vol. 1175. No. 1. IOP Publishing, 2019. (Year: 2019).*
Draz, Umar, et al. "A real-time smart dumpsters monitoring and garbage collection system." 2017 Fifth International Conference on Aerospace Science & Engineering (ICASE). IEEE, 2017. (Year: 2017).*
Medehal, Aarati, et al. "Automated smart garbage monitoring system with optimal route generation for collection." 2020 IEEE international smart cities conference (ISC2). IEEE, 2020. (Year: 2020).*
Extended Search Report for European Patent Application No. 18215015.1, dated Jul. 1, 2019, 3 pages.
Official Action for Singapore Patent Application No. 10201911423T, dated Aug. 21, 2020, 3 pages.
Official Action for Singapore Patent Application No. 10201911423T, dated Jul. 12, 2021, 7 pages.
Extended Search Report for European Patent Application No. 18215141.5, dated Jul. 5, 2019, 4 pages.
Official Action for Singapore Patent Application No. 10201911425P, dated Aug. 21, 2020, 4 pages.
Official Action for Singapore Patent Application No. 10201911425P, dated Jul. 18, 2021, 6 pages.
Official Action for U.S. Appl. No. 16/718,701, dated Apr. 29, 2022 39 pages.
Article 94(3) Communication for Europe Patent Application No. 18215015.1, dated Jul. 1, 2022, 7 pages.
Article 94(3) Communication for Europe Patent Application No. 18215141.5, dated Jul. 1, 2022, 8 pages.
Official Action for U.S. Appl. No. 16/718,701, dated Sep. 6, 2022 34 pages.
Notice of Allowance for U.S. Appl. No. 16/718,701, dated Sep. 14, 2023, 11 pages.
Offical Action for U.S. Appl. No. 16/718,701, dated Apr. 28, 2023, 37 pages.
Article 94(3) Communication to Europe Patent Application No. 18215015.1, dated Jun. 27, 2024, 6 pages.

* cited by examiner

SYSTEM FOR OPERATING A WASTE CONTAINER AND METHOD FOR TRANSFERRING DATA FROM A WASTE CONTAINER

CROSS-REFERENCE TO RELATED APPLICATION

This application claims the benefit of European Patent Application No. 18215015.1 filed Dec. 21, 2018, the entire contents of which are incorporated herein by reference in its entirety.

FIELD

The present invention relates to a system for operating a waste container, comprising a waste container having an electronic control device, a first communication interface for transmitting and receiving data and a storage device, and having a server which is remote from the waste container and has a second communication interface. Furthermore, the invention relates to a method for transmitting data from a waste container.

BACKGROUND

For the disposal of household waste, large-scale waste containers are often provided, which are used by several households. Such waste containers may be associated with, for example, a household or a community. As a rule, only registered users should have access to such waste containers, whereby access can be blocked, for example, if the disposal costs are not paid. Such access can be realized by means of various electronic systems. Accordingly, a user of the waste container must be provided with a specific means of identification by means of which he can gain access to the waste container. Such means for identification may be a communication device, for example a smartphone. Before opening the access to the waste container, it must be checked if the user is authorised to access it, based on the identification data. For this purpose, a data connection to a server is necessary, which server contains the corresponding identification and authorisation data.

A problem with such systems is that the communication between the waste container and the server is energy-intensive and causes costs due to the use of network resources.

In particular, in waste containers that are not assigned to a household, but are placed in a public space, the energy supply is often problematic because the energy supply must be protected from access by unauthorised persons. In addition, energy suppliers require metering equipment to account for the required energy for billing. The costs of these meters often exceed the energy costs many times, so here alternative solutions are desired. Previous proposed solutions include, for example, the decentralised power supply via batteries, solar cells or generators (conversion of wind energy or mechanical energy introduced by user). However, these solutions are also costly and enlarge the waste container with the same capacity, which is also undesirable in public areas.

Further costs arise due to the often provided use of mobile connections for the transmission of data between a server and a waste container. The waste container must be equipped for such a data transmission with a corresponding and power-consuming transmission technology. Such waste containers are therefore relatively expensive and require power to communicate over the mobile network, and this communication also generates costs and administrative burden due to the fees charged by the mobile network operator.

SUMMARY

The object of the present invention is therefore to provide a system which eliminates or at least minimises the above-mentioned disadvantages.

This object is achieved by the independent claims, in particular the system according to claim 1 and the method according to claim 11.

An essential aspect of the invention is a system for operating a waste container comprising a waste container which has an electronic control device, a first communication interface for transmitting and receiving data and a storage device, and a server which is remote from the waste container and has a second communication interface, wherein usage data can be stored in the storage device by the control device after use of the waste container, wherein the first communication interface has no device for direct data transmission to the second communication interface, wherein an indirect first data transfer between the first communication interface and the second communication interface and/or between the second communication interface and the first communication interface can be initiated via at least one further communication interface, which is provided in a further communication device which is not associated with the waste container, wherein the stored usage data are transferable via the first data transfer to the server.

Such a system has the advantage that the waste container does not have to include a powerful communication interface, by means of which the direct communication (e.g. via a mobile network) with the server is made possible. Rather, it is provided that, for data exchange between waste container and server, communication channels are used, which are provided by another communication device which is not associated with the waste container. The energy required for the transmission of the data via a preferably at least partially wireless network to the server is therefore supported by the further communication device. Likewise, the network user fees incurred in the transfer are charged to the other communication device. Thus, from the waste container or its (first) communication interface only a transfer of data to the other communication device is necessary. Preferably, such a communication device is selected from certain communication devices, which are located in the immediate vicinity of the waste container or at regular intervals in the immediate vicinity of the waste container.

The first data transfer can be a unidirectional or a bidirectional data transfer. A unidirectional data transfer here means that data is transferred only in one direction, i.e. from the first communication interface via the further communication interface to the second communication interface or from the second communication interface via the further communication interface to the first communication interface. A bidirectional data transfer here means that a data exchange takes place in both directions.

The data would therefore be able to be exchanged in both directions by the first communication interface and the second communication interface, wherein according to the invention the data transfer takes place via the further communication interface.

A waste container may be understood to be a so-called residual waste container or recyclable collection container, such as paper, bottle or plastic collection container.

Advantageously, there is a communication connection between the first communication interface and the control device and between the control device and the storage device.

The terms "first data transfer" and "the subsequent data transfers" are not to be understood as being consecutive in time. Rather, these terms should be understood as a specific type of data transfer, in particular with regard to the communication interfaces used.

The data transmitted by means of the first data transfer can basically be of very different nature. The transmitted data may be user data stored in the storage device. Such user data are data that arise through the use of the waste container. These can be user data of a single user or include the user data of multiple users who have used the waste container since the last first data transfer. Typically, the user data are transmitted unidirectionally from the first communication interface via the further communication interface to the second communication interface.

According to an embodiment, the user can be identified by means of a communication device which itself has no communication connection to the server. In such an offline use corresponding user data are stored by the controller in the storage device of the waste container. Such user data may include the following data: Identification data, data on the type and weight of the deposited waste, deposit times, etc.

According to a further embodiment, the user is identified by means of a communication device which itself has a communication connection to the server. Here, advantageously, the identification of the user by the communication device can take place by means of a communication of the communication device with the server. Preferably, therefore, the user data can be transmitted to the server via this communication device. However, it is advantageous if, during such online use, a backup copy of the user data is stored by the control device in the storage device of the waste container. These backup copies can then be transmitted to the server during a next first data transfer and used to verify the originally transmitted data. Such user data may also include the following data: Identification data, data on the type and weight of the deposited waste, deposit times, etc.

The data transmitted to the server by means of the first data transfer may advantageously also comprise sensor data originating from sensors present in the waste container or located in the vicinity of the waste container. Such data would preferably be transmitted from the first communication interface via the further communication interface to the second communication interface.

In addition, it would be conceivable to transmit time data, system information, user behaviour, (unsuccessful) use attempts, (unsuccessful) login attempts by means of the first data transfer. Such data would preferably be transmitted from the first communication interface via the further communication interface to the second communication interface.

The data transmitted by the first data transfer may also include software or firmware updates provided by the server for corresponding components of the waste container. Such data would preferably be transmitted from the second communication interface via the further communication interface to the first communication interface. For this purpose, it would be conceivable that individual packets are transmitted via different communication devices to the storage device of the waste container.

Preferably, the data transmitted by means of the first data transfer may further include access lists, so-called white or blacklists. Such access lists list the authorisations of the users. This is particularly relevant for the said offline usage. If, for example, the payment of the corresponding fees by a user is missing, his authorisation may be revoked.

It would also be conceivable that the data transmitted are part of a bidirectional data transfer. For example, the server could first submit a request for specific data to the waste container, whereupon the latter will provide the requested data. It would also be conceivable that by means of the first data transfer a remote diagnosis by the server in the case of disruptions or malfunctions of the systems of the waste container are performed.

According to a particularly preferred embodiment, a first communication device comprises a third communication interface. Preferably, the unidirectional or bidirectional first data transfer between the first communication interface and the second communication interface can take place via the third communication interface. Advantageously, an emptying or service vehicle is equipped with the first communication device. It may be advantageous if the first communication device is a part of a computing unit, a so-called on-board computer (OBC) of the emptying or service vehicle. Since such emptying or service vehicles inevitably come at regular intervals into the immediate vicinity of the waste container, a first data transfer via a communication device, which is located in such a vehicle, is particularly advantageous. Moreover, such a vehicle can easily provide the first communication device with a sufficient energy supply. Preferably, the data transfer takes place between the first and the third communication interface via a first communication channel.

According to a further preferred embodiment, a second communication device comprises a fourth communication interface. Preferably, the unidirectional or bidirectional first data transfer between the first communication interface and the second communication interface can take place via the fourth communication interface. Advantageously, the second communication device is assigned to a user. Preferably, the second communication device is a portable data processing device, preferably with a display device, such as a mobile phone, a smartphone, a tablet or a laptop. Such an embodiment has the advantage that a user of the waste container can already use such a second communication device, such as a smartphone, for the identification process in online use. In particular, a smartphone is preferred as a communication device because it is widely used and has a variety of communication interfaces that could be used to form a data connection to the waste container on the one hand and/or the server on the other hand. In addition, a smartphone has a display device via which information could be sent to the user. The transfer of data preferably takes place between the first and the fourth communication interface via a second communication channel.

According to a further preferred embodiment, the unidirectional or bidirectional first data transfer between the first communication interface and the second communication interface can take place both via the first communication device, or the third communication interface, as well as via the second communication device, or the fourth communication interface.

However, the present invention is not limited to a particular type of communication device. A corresponding communication device only has to have a further communication interface which is capable of communicating with the first communication interface of the waste container and the second communication interface of the server and forwarding the data accordingly.

A communication channel should be understood as a transmission path. Such a transmission path connects a transmitter and a receiver. This transmitter or receiver is advantageously part of the respective communication interface or a corresponding further device. Accordingly, it is advantageous if the communication device and the waste container are equipped with a corresponding transmitter or receiver of the respective technology. Preferably, complementary transmitter-receiver pairs are present in the waste container and communication device and communication device and server. A complementary transmitter-receiver pair in the waste container and server is not required and preferably does not exist.

According to a further preferred embodiment, a second data transfer can be initiated between the first communication interface and the fourth communication interface in order to identify a user before the waste container is used. Advantageously, the second data transfer takes place between the first and the fourth communication interface via the second communication channel. The second data transfer is preferably bidirectional and may include identification data of the user and/or identification data of the waste container intended for use. Preferably, after the second data transfer, a third data transfer takes place between the fourth communication interface of the second communication device and the second communication interface of the server. This third data transfer advantageously comprises the identification data of the user and/or identification data of the waste container intended for use. The third data transfer preferably takes place between the fourth communication interface and the second communication interface via the eighth communication channel.

Preferably, the server further comprises an authentication manager and a database. The authentication manager preferably assigns the authorisation data of the user stored in the database to the received identification data. On the basis of this assignment, access to the waste container intended for use can be released or denied for this user. The corresponding authorisation data are preferably transmitted from the second communication interface via the fourth communication interface to the first communication interface of the waste container. The control device of the waste container can then advantageously provide access to the waste container on the basis of the authorisation data. Such an identification process is preferably referred to as online usage.

According to a further preferred embodiment, the waste container comprises a receiving device. Preferably, a fourth data transfer can take place via a third communication channel between the receiving device and the first communication interface. A receiving device is to be understood as a device which is suitable for receiving identification data of a user. The fourth data transfer may also be a unidirectional or bidirectional data transfer.

Preferably, to identify a user, a fifth data transfer of identification data between the receiving device and an identification device can be initiated by means of a fourth communication channel before the waste container is used. For the identification of the user no data connection to the server is made. Such use is advantageously referred to as offline use.

Advantageously, such an identification device can be a transmitter, which transmits the identification data of the user by means of wireless technology. Advantageously, a specific code or the like is transmitted to the receiving device by means of the fifth data exchange. The identification device may be a transmitter provided specifically for the use of the waste container, which transmitter is made available to the users by the operator.

However, it would also be conceivable that the identification device is a passive element, for example an (RFID) chip card, magnetic card or the like. The identification data are contained or stored on such a passive element. The receiving device would be an active element in this case, which reads the identification data from the identification device. Such an identification device can also be provided to the users specifically for the use of the waste container by the operator.

However, it would also be conceivable that the identification device is a second communication device, for example a smartphone. Some users prefer offline use, but still want to identify themselves with a second communication device because such a device, such as a smartphone, is usually always at hand. Typically, the second communication device, such as a smartphone or similar device, has functions that are capable of transmitting corresponding identification data to the receiving device.

It would also be conceivable that such a receiving device is suitable for receiving other identification data of the user. Thus, the receiving device can be an input device for a code, for example a numeric keypad. The receiving device may also be a reader for biometric data such as fingerprints or iris recognition or a facial recognition device.

The data received by the receiving device are transmitted via the fourth data transfer by means of the third communication channel to the first communication interface and further to the control device. The third communication channel preferably uses wireless technology. Accordingly, the receiving device can be placed at any point in the immediate vicinity outside the waste container. Furthermore, costly wiring can be saved.

The fourth data transfer can be unidirectional as well as bidirectional. A bidirectional data transfer allows, for example, the transfer of software or firmware updates to the receiving device.

The user data resulting from the offline use are stored by the control device in the storage device of the waste container. These user data can advantageously be transmitted to the server by means of the next first data transfer. The server can then use the user data to create invoices, statistics or similar.

Advantageously, at least one access list, a so-called white or black list, is stored in the storage device for offline use. Such an access list comprises authorisation data of the users. The identification data received by the receiving device are preferably assigned to the authorisation data by the control device. Based on the authorisation data, access to the waste container can be granted or denied. The access lists can advantageously be updated by the first data transfer. For example, a user who has exceeded a certain limit for deposited waste may have the authorisation withdrawn until a corresponding additional payment has been made.

According to a further preferred embodiment, the waste container comprises at least one sensor device. Advantageously, a sixth data transfer can take place via a fifth communication channel between the at least one sensor device. Preferably, the sixth data transfer can be unidirectional or bidirectional. A bidirectional data transfer allows, for example, the transfer of software or firmware updates to the at least one sensor device.

The at least one sensor device could advantageously have a sensor for monitoring the temperature in the interior of the waste container. By such monitoring the emergence of a fire in the container can be detected and reported quickly.

Furthermore, the sensor device could have a filling level sensor, which ensures timely emptying. The level sensor can perform sonographic or optical level detection.

It would also be possible for the sensor device to have a motion sensor for movements in the interior of the waste container. Thus, for example, trapped animals could be detected.

A sensor for detecting movements of the waste container itself or a sensor for detecting force effects on the waste container could also be provided. Such sensors could detect and report vandalism.

Furthermore, a weight sensor could be provided, which detects the weight of the deposited waste. Such a sensor could be used to scale the bill of costs for the user based on the weight of the deposited waste. Thus, a "fair" cost accounting for the user would be possible.

It would also be conceivable to provide sensors which detect the deposit of certain materials, such as metals. Thus, in a residual waste container the unauthorised deposit of such materials could be detected.

Furthermore, the sensor device may be an odour sensor, by means of which an excessive odour pollution of the environment of the waste container can be prevented by carrying out premature emptying.

Finally, the sensor device may also be a noise sensor.

According to a further preferred embodiment, the at least one sensor device is a location determining device, by means of which the location of the waste container can be determined. By such a location determining device, the waste container can be found again, for example, after a theft or vandalism. Such a location determining device could be, for example, a GPS device.

For determining the location, BSSID (Basic Service Set Identification) data of WLAN access points located in the vicinity of the waste container can advantageously also be queried by a suitable location determining device. Such BSSID data can then be transmitted to the server. These data can then be evaluated by the server in such a way that the location of the waste container can be determined.

According to a further preferred embodiment, control data can be transmitted from the first communication interface to at least one internal device of the waste container or at least one external device by means of a seventh data transfer. Preferably, the seventh data transfer takes place via a sixth communication channel. Preferably, the seventh data transfer is unidirectional or bidirectional. Preferably, the seventh data transfer via a sixth communication channel is based on wireless technology. This has the advantage that complex wiring in the waste container is no longer necessary. In addition, external facilities can be controlled.

Advantageously, the control data are generated at least partially by the control device and/or at least partially by a sensor device. Advantageously, the control data is generated on the basis of a triggering event.

The control of the internal or external devices preferably takes place on the basis of sensor data of a sensor device. The sensor data are advantageously evaluated by the control device. The control device then generates the corresponding control data, which are then transmitted via the seventh data transfer to at least one internal or at least one external device.

However, it would also be conceivable that the sensor device already has an evaluation device which at least partially evaluates the sensor data and at least partially generates the control data, which are then transmitted via the seventh data transfer to at least one internal or at least one external device.

However, the control data can also be generated at least partially by the server and transmitted via the first data transfer to the waste container. These control data are then transmitted via the seventh data transfer to at least one internal or at least one external device.

Preferably, the at least one internal device or the at least one external device may be an actuator, a locking device, a display device, an output device or a fire extinguisher.

For example, the level sensor could measure a certain filling level, whereupon control data are transmitted to the locking device so that it locks the waste container. At the same time, a display or output device could be activated, which indicates that the waste container is currently not usable. Similarly, if a fire is detected in or near the waste container by an odour or temperature sensor, an internal or external fire extinguisher could be activated by means of the control data.

According to another preferred embodiment, the system can be used to unlock the waste container in an emptying process. To enable an emptying process, a corresponding lock must be opened. Accordingly, it is advantageous if authorisation takes place after establishing a communication connection between the first communication interface and the second communication interface. In this case, the control device detects the presence of an emptying vehicle and forwards corresponding control data via the first communication interface to the corresponding locking device. After the emptying process, the removal of the emptying vehicle can be detected, whereupon the control device outputs corresponding control data via the first communication interface to the corresponding locking device for locking.

According to a preferred embodiment, the data transfer via the communication channels one to six is based on wireless technology. Preferably, this wireless technology has a comparatively short range. The wireless technology preferably has a range below 300 m, preferably below 100 m, preferably below 50 m, preferably below 30 m, preferably below 10 m, preferably below 5 m, preferably below 3 m, preferably below 1 m, particularly preferably below 50 cm. Advantageously, the wireless technology is selected from a group comprising NFC (near field communication), RFID (radio-frequency identification), WLAN (wireless-local area network), Bluetooth® technology and optical transmission technology.

Both NFC technology and RFID technology use high-frequency alternating magnetic fields for data transmission. The RFID technology is usually a so-called "connectionless" transmission. Here, a passive transponder is used, which is powered by the alternating field of a reader. The NFC technology also provides a so-called "connection-based" transmission. In the case of connection-based transmission or else peer-to-peer transmission, a transmission between two equivalent transmitters is established.

Meanwhile, a variety of commercially available smartphones are equipped with an NFC device. The NFC technology achieves a data transfer rate of 106 to 424 kbit/s. The data transmission is based on an amplitude modulation of a high-frequency magnetic field with a standardised frequency of 13.56 MHz. Only two users can participate in a data transmission, a so-called initiator, which acts as a sender of information, and a receiver, which receives this information.

The NFC technology also provides a "connectionless" transmission analogous to the RFID technology. Such transmission is often referred to as passive transmission. Here only the initiator generates the high-frequency magnetic field. The receiver can transmit data by means of a load modulation. In this case, an energy absorption from the magnetic field by a specially tuned resonant circuit of the receiver takes place, whereupon the initiator reacts.

In the case of "connection-dependent" or active transmission, both the initiator and the receiver generate a high-frequency magnetic field. First, a so-called "handshake" is performed by authentication taking place and by various settings, such as the optimal transmission speed, being selected. Subsequently, the data exchange is carried out. This transmission, referred to as "active-active" or also referred to as "peer-to-peer", represents a preferred embodiment. Due to the two-sided authentication, this active transmission is considered much safer compared to the "passive" transmission (in which at least one communication partner is not actively transmitting the high-frequency magnetic field).

According to a further preferred embodiment, the data transfer takes place between the third and the second communication interface via a seventh communication channel. Preferably, the data transfer takes place between the fourth and the second communication interface via an eighth communication channel. Advantageously, the seventh and the eighth communication channels are at least partially based on wireless technology with a comparatively long range, preferably with a maximum range of over 30 m, preferably over 100 m, preferably over 500 m, preferably over 1 km, more preferably several km. Preferably, the seventh and the eighth communication channels are based on transmission technology selected from a group comprising WLAN connection, mobile connection, 2G (GSM) connection, 3G (UMTS) connection, GPRS connection, 4G (LTE, WMax) connection, 5G connection. Of course, other connections, such as radio links, for example in the ISM band, come into consideration.

The communication channels one to six thus belong to a first group, which preferably use wireless technology with a comparatively short range. The communication channels seven and eight thus belong to a second group, which preferably at least partially use wireless technology with a comparatively long range. The different configuration of the groups of communication channels makes it possible for the respective communication channels to have different ranges and/or transmission powers. As a result, an asymmetric communication can be formed in which the ranges and/or transmission power of the communication channels of the first group are preferably significantly lower than those of the second group.

This has the consequence that for the communication between the first and the further communication interface via the first or second communication channel, the energy requirement is significantly reduced compared to a direct communication between the first and the second communication interface. The communication between the first and the second communication interface is still ensured with the involvement of the communication device, wherein the increased energy requirement for the communication to and from the second communication interface via the seventh or eighth communication channel is met by the communication device and/or other network participants (e.g. LAN or WLAN router, internet provider, network infrastructure of a mobile service provider).

In accordance with a further preferred embodiment, the further communication device, for example the first or second communication device, has a data processing device which is used to modulate data for transmission on different communication channels and/or for coding and/or for decoding the data received from respective communication interfaces before the data are forwarded to the respective other communication interface. The data transmitted by the first data transfer are forwarded basically unchanged by the further communication device. However, it may be necessary to modulate the data in terms of the different transmission technology used on the subsequent communication channel.

According to a further preferred embodiment, the communication interfaces one to four have a control device which carries out a test method for error detection and monitoring in the data transmission. Such a test method may be, for example, a parity check or the like.

Advantageously, the first data transfer can be initiated within certain time intervals. However, it would also be conceivable to initiate a first data transfer due to another triggering event. Such a triggering event can also be generated by sensor data, such as exceeding a certain filling level. Likewise, a malfunction of a component of the waste container may be such a triggering event. Finally, the need to perform firmware or software updates may be such a triggering event. The first data transfer can therefore take place by means of the next available communication device. The first data transfer can also be carried out in real time.

Likewise, the data transfers two to seven can be initiated within certain time intervals. These data transfers can also be carried out in real time or on the basis of a certain triggering event mentioned above.

According to a preferred embodiment, the waste container has a lock device with a locking device. The locking device is preferably an electrical locking mechanism. The lock device preferably has a limited receiving volume, so that only a limited amount of waste can be deposited in the container in a single opening. Optionally, one or more devices for determining the added and/or existing amount of waste may be present in the lock and/or the receiving area of the waste container. For example, these could be devices for weight and/or volume determination.

Advantageously, the waste container has a power supply, which supplies the electrical and electronic equipment and components with power. The power supply is advantageously a battery. Alternatively or cumulatively, a solar cell or the like could also be provided.

Another essential aspect of the invention is a method for data transmission between a waste container, which has an electronic control device, a first communication interface for transmitting and receiving data and a storage device and a server remote from the waste container having a second communication interface, the method comprising the following steps:

establishing a data connection by means of a communication channel between the first communication interface and a further communication interface of another communication device which is not part of the waste container;

authorising the data connection;

initiating a first indirect data transfer between the first communication interface and the second communication interface and/or between the second communication interface and the first communication interface via at least one further communication interface.

This method allows communication between the waste container and the server without the waste container having to provide an energy- and cost-intensive communication interface that allows direct communication with the remote server. Instead, a data connection between one communication device having an additional communication interface and the server can (also) be used for indirect communication between the waste container and the server. Establishing a data connection involves making a data connection. The initiator can be the first or the further communication interface. Furthermore, it may be advantageous if the transmitted data are checked for their accuracy.

The method can be equipped with all the features already described above in the context of the system individually or in combination with each other, and vice versa.

The waste container preferably has a storage device on which usage data are stored after the waste container has been used. Preferably, the stored usage data are transmitted via the first data transfer.

According to a particularly preferred embodiment, a first communication device comprises a third communication interface. Preferably, the unidirectional or bidirectional first data transfer takes place between the first communication interface and the second communication interface via the third communication interface. Advantageously, an emptying or service vehicle is equipped with the first communication device. It may be advantageous if the first communication device is a part of a computing unit, a so-called on-board computer (OBC) of the emptying or service vehicle. Since such emptying or service vehicles inevitably come at regular intervals into the immediate vicinity of the waste container, a first data transfer via a communication device, which is located in such a vehicle, is particularly advantageous. Moreover, such a vehicle can easily provide the first communication device with a sufficient energy supply. Preferably, the data transfer takes place between the first and the third communication interface via a first communication channel.

According to a further preferred embodiment, a second communication device comprises a fourth communication interface. Preferably, the unidirectional or bi-directional first data transfer between the first communication interface and the second communication interface can take place via the fourth communication interface. Advantageously, the second communication device is assigned to a user. Preferably, the second communication device is a portable data processing device, preferably with a display device, such as a mobile phone, a smartphone, a tablet or a laptop. Such an embodiment has the advantage that a user of the waste container can already use such a second communication device, such as a smartphone, for the identification process in online use. In particular, a smartphone is preferred as a communication device, since it is widely used and has a variety of communication interfaces that can be used to form a data connection to the waste container on the one hand and/or the server on the other hand. In addition, a smartphone has a display device via which information could be sent to the user. The transfer of data preferably takes place between the first and the fourth communication interface via a second communication channel.

According to a further preferred embodiment, the unidirectional or bidirectional first data transfer between the first communication interface and the second communication interface can take place both via the first communication device, or the third communication interface, as well as via the second communication device, or the fourth communication interface.

According to a further preferred embodiment, the data transfer via the communication channels one and two is based on wireless technology, wherein the wireless technology has a range of less than 300 m, preferably less than 100 m, preferably less than 50 m, preferably less than 30 m, preferably less than 10 m, preferably less than 5 m, preferably less than 3 m, preferably less than 1 m, particularly preferably less than 50 cm, wherein the wireless technology is selected from a group comprising NFC technology, RFID technology, WLAN technology, Bluetooth® technology and optical transmission technology.

According to a further preferred embodiment, the data transfer between the third and the second communication interface takes place via a seventh communication channel, wherein the data transfer between the fourth and the second communication interface takes place via an eighth communication channel, wherein the seventh and the eighth communication channels are based at least partially on wireless technology with a maximum a range of over 30 m, preferably over 100 m, preferably over 500 m, preferably over 1 km, more preferably several km, and a transmission technology, which is selected from a group comprising WLAN connection, mobile connection, 2G (GSM) connection, 3G (UMTS) connection, GPRS connection, 4G (LTE, WiMax) connection, 5G connection.

Authorising a data connection may include recognising the further communication device by the first communication interface or by the control device of the waste container. Such an operation includes assigning transmitted identification data to stored data. Such an authorisation can be used to detect, for example, whether the further communication device belongs to an emptying or service vehicle. In the case of a present evacuation vehicle, for example, a locking device can preferably be opened by the control device, whereby emptying of the waste container can take place.

However, such an authorisation may also be only a system-related authorisation, for example a "handshake" in an NFC connection, in which various settings, such as the optimal transmission speed, are selected. A so-called "pairing" in a Bluetooth connection can also be such an authorisation.

According to a preferred embodiment, the method may include controlling access to a waste container for a user, comprising the following further steps:
a) initiating a transfer of identification data from the first communication interface to a second communication device which can be assigned to a user and has a fourth communication interface before the waste container is used;
b) transferring the identification data for the waste container and the user from the second communication device having the fourth communication interface to a server having a second communication interface;
c) receiving the identification data by the second communication interface and supplying the identification data to an authentication manager of the server;
d) assignment of user data from a database of the server to the identification data by the authentication manager;
e) generating authorisation data for granting or denying access to that waste container for that user;
f) transmitting the authorisation data from the second communication interface to the fourth communication interface and/or the second communication device and optionally conversion of the signal in the second communication device;
g) transmitting the authorisation data from the fourth communication interface and/or the second communication device to the first communication interface;
h) granting or denying access to this waste container to the user as a function of the authorisation data received at the first communication interface.

In a further preferred variant of the method, different communication channels are used for steps a) and b). This allows the range of the communication channels and the energy required by the communication interface used to be adapted to the respective requirements. Thus, a particularly energy-saving and inexpensive (indirect) communication between the first and the second communication interface is made possible.

In a further preferred variant of the method, it is provided that a wireless technology having a low power consumption and a range of less than 300 m is used for step a). This variant of the method is particularly preferred because step a) has been identified as being particularly critical with regard to the energy requirements of the waste container and the costs of data transmission. Short-range wireless technologies typically allow low power consumption while still providing a relatively high data rate. In addition, such wireless technologies are usually usable free of charge, so that at least for this section of the communication between the first and second communication interface no costs are incurred. Particularly preferred for this is a transmission technology selected from a group comprising NFC technology, RFID technology and optical transmission technology. The resulting advantages have already been described above in relation to an apparatus.

Furthermore, a method variant is preferred in which, for step b), wireless technology with a maximum range of more than 30 m is used at least in some sections. The maximum range should be understood in this context as the range of communication between two communication interfaces under normal conditions without obstacles located between the communication interfaces. Such a range usually allows the (wireless) transmission of data from the communication device to at least the nearest transfer point, via which the data are fed (possibly via a local area network (LAN)) into a wide area network (WAN) and can then be forwarded to the second communication interface. The transfer point or access point can be, for example, a WLAN router or a transmission mast of a mobile service provider. A large range of the wireless technology used at least partially for step b) thus allows a large range of movement of the user while maintaining the wireless connection and consequently also a large variability in the selection of a location for the waste container. For a further increased variability of the location and the extensive independence of existing infrastructure, the range of the wireless technology used at least in some sections for step b) is preferably over 100 m, preferably over 500 m, preferably over 1 km, particularly preferably several km. The use of a transmission technology selected from a group comprising WLAN connection, mobile connection, GSM connection, UMTS connection, GPRS connection, LTE connection and DECT has proven particularly suitable.

In terms of the method, it is preferred that the authorisation data transmitted in step g) from the fourth communication interface and/or the second communication device to the first communication interface comprise a unique or rolling code. This is preferred to prevent unauthorised persons from reading the authentication data and using this data for unauthorised access to the waste container. By using a one-time or rolling code, the current access grant data will be rendered useless for the next access attempt and unauthorised access with that data at a later date will no longer be possible.

BRIEF DESCRIPTION OF THE DRAWINGS

Other advantages, aims and properties of the present invention are explained with reference to the following description of the attached drawings. Similar components may have the same reference signs in the various embodiments.

In the drawings.

DETAILED DESCRIPTION

Figure 1:
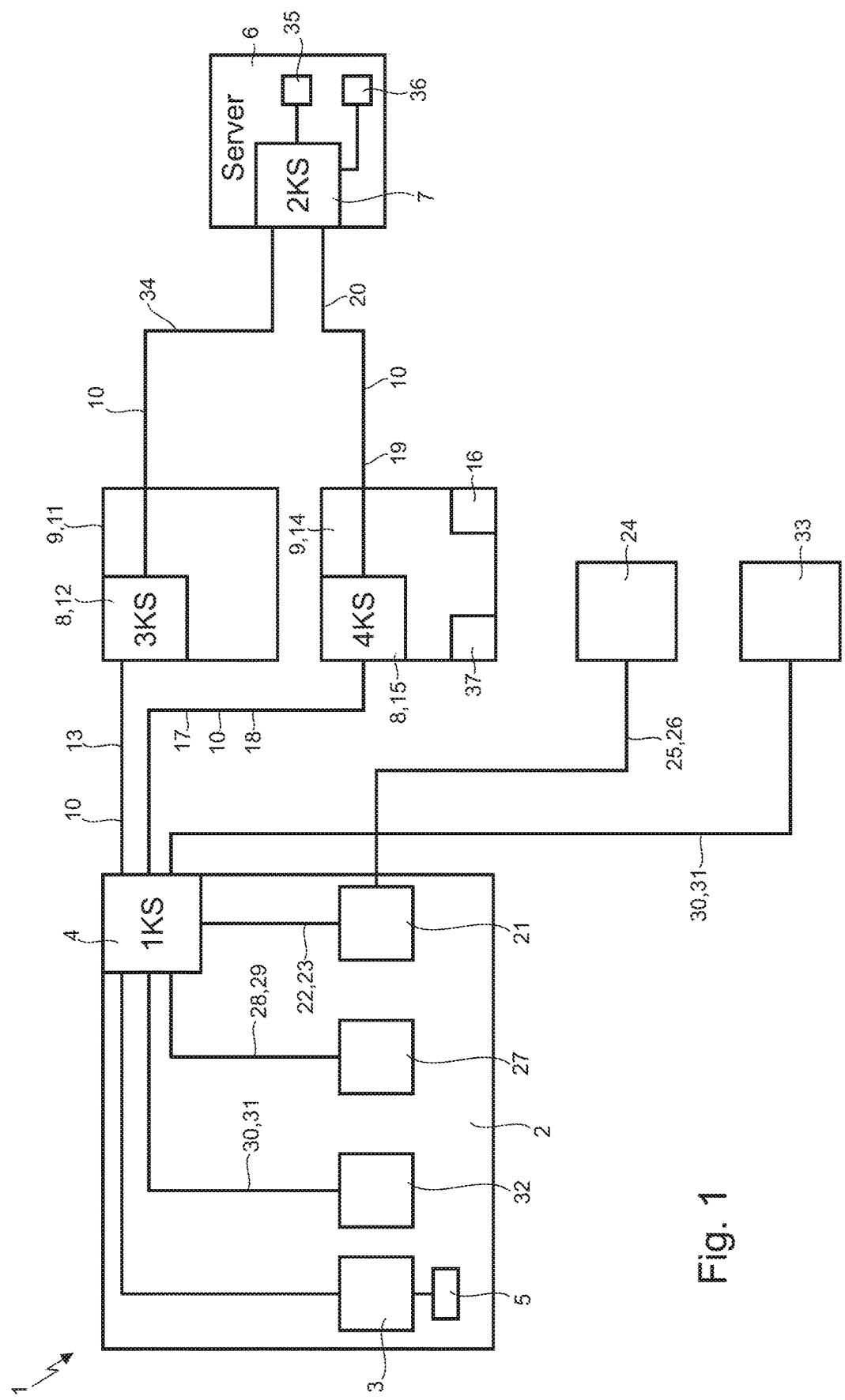
FIG. 1 shows a schematic diagram of the system for delivering messages to a user of a waste container according to one embodiment.
Figure 2:
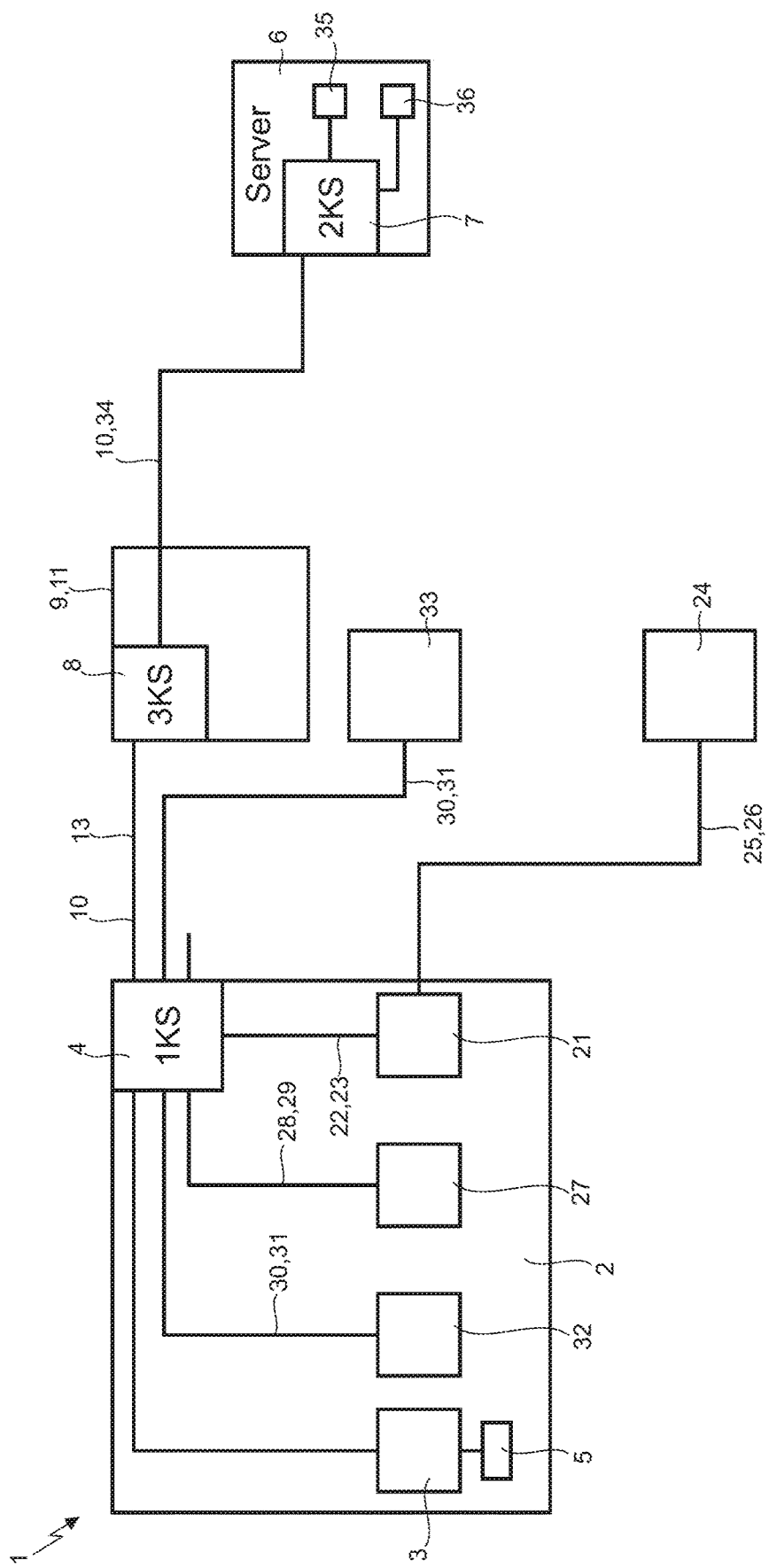
FIG. 2 shows a schematic diagram of the system for delivering messages to a user of a waste container according to another embodiment.
Figure 3:
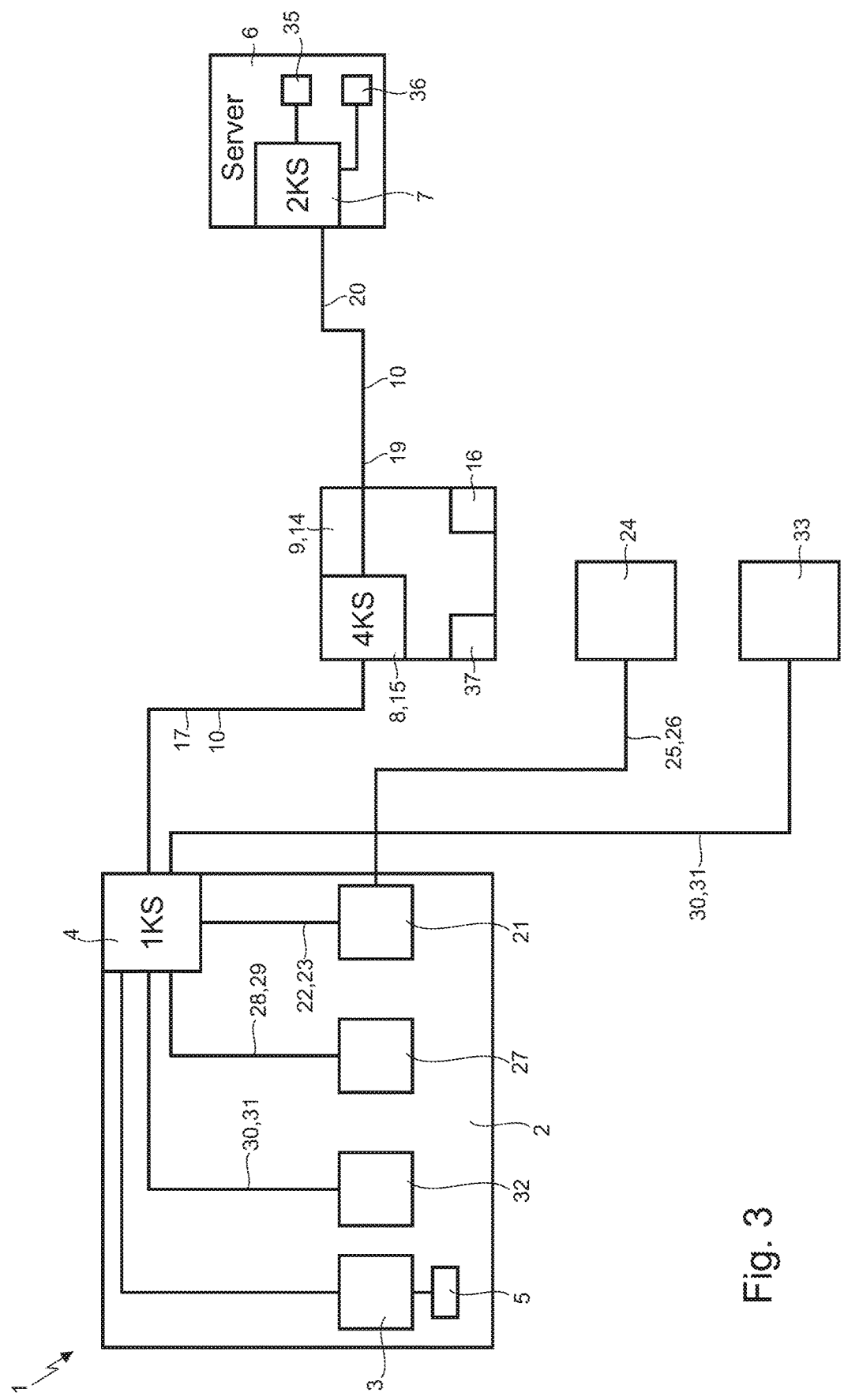
FIG. 3 shows a schematic diagram of the system for delivering messages to a user of a waste container according to another embodiment.

FIGS. 1 to 3 show a system (1) for operating a waste container (2) comprising a waste container (2) which has an electronic control device (3), a first communication interface (4) for transmitting and receiving data and a storage device (5), and a server (6) which is remote from the waste container and has a second communication interface (7), wherein usage data can be stored in the storage device (5) by the control device (3) after use of the waste container (2), wherein the first communication interface (4) has no device for direct data transmission to the second communication interface (7), wherein an indirect first data transfer between the first communication interface (4) and the second communication interface (7) and/or between the second communication interface (7) and the first communication interface (4) can be initiated via at least one further communication interface (8, 12, 15), which is provided in a further communication device (9, 11, 14), which is not associated with the waste container (2), wherein the stored usage data are transferable via the first data transfer (10) to the server (6).

Furthermore, FIGS. 1 to 3 show a method for data transmission between a waste container (2) which has an electronic control device (3), a first communication interface (4) for transmitting and receiving data and a storage device (5) and a server (6) remote from the waste container (2) and having a second communication interface (7), the method comprising the steps of:

establishing a data connection by means of a communication channel (13, 17) between the first communication interface (4) and a further communication interface (8, 12, 15) of a further communication device (9, 11, 14), which is not part of the waste container (2);

authorising the data connection;

initiating an indirect first data transfer (10) between the first communication interface (4) and the second communication interface (7) and/or between the second communication interface (7) and the first communication interface (4) via at least one further communication interface (8, 12, 15).

In the embodiment according to FIG. 2, the system (1) comprises a first communication device (9, 11), a third communication interface (8, 12), wherein the unidirectional or bidirectional first data transfer (10) between the first communication interface (4) and the second communication interface (7) can take place via the third communication interface (8, 12). The first communication device (9, 11) is provided in an emptying or service vehicle. The data transfer takes place here between the first (4) and the third communication interface (8, 12) via a first communication channel (13).

In the embodiment according to FIG. 3, the system (1) comprises a second communication device (9, 14), a fourth communication interface (8, 15), wherein the unidirectional or bidirectional first data transfer between the first communication interface (4) and the second communication interface (7) can take place via the fourth communication interface (8, 15). The second communication device (9, 14) is assigned to a user, wherein the second communication device (9, 14) is a portable data processing device, preferably with a display device (16), for example a mobile phone, a smartphone, a tablet or a laptop. The transfer of data between the first (4) and the fourth communication interface (8, 15) takes place via a second communication channel (17).

In the embodiment according to FIG. 1, the first data transfer (10) can take place both via the third communication interface (8, 12) of the first communication device (9, 11) and via a fourth communication interface (8, 15) of a second communication device (9, 14).

In order to identify a user before using the waste container (2), a second data transfer (18) can be initiated between the first communication interface (4) and the fourth communication interface (8, 15). Furthermore, a subsequent third data transfer (19) can be initiated between the fourth communication interface (8, 15) and the second communication interface (7) of the server (6). The second data transfer (18) of identification data takes place between the first (4) and the fourth communication interface (8, 15) via the second communication channel (17).

The third data transfer (19) takes place between the fourth communication interface (8, 15) and the second communication interface (7) via an eighth communication channel (20).

According to an embodiment, said method may include controlling access to the waste container (2) for a user, comprising the further steps of:
a) initiating a transfer of identification data from the first communication interface (4) to a second communication device (9, 14) which can be assigned to a user and has a fourth communication interface (8, 15) before the waste container (2) is used;
b) transferring the identification data for the waste container (2) and the user from the second communication device (9, 14) having the fourth communication interface (8, 15) to a server (6) having a second communication interface (7);
c) receiving the identification data by the second communication interface (7) and supplying the identification data to an authentication manager (35) of the server (6),
d) assigning user data from a database (36) of the server (6) to the identification data by the authentication manager (35);
e) generating authorisation data to grant or deny access to that waste container (2) for that user;
f) transmission of the authorisation data from the second communication interface (7) to the fourth communication interface (8, 15) and/or the second communication device (9, 14) and optionally conversion of the signal in the second communication device (9, 14);
g) transmitting the authorisation data from the fourth communication interface (8, 15) and/or the second communication device (9, 14) to the first communication interface (4);
h) granting or denying access to this waste container (2) to the user as a function of the authorisation data received at the first communication interface (4).

The waste container (2) may optionally comprise a receiving device (21). A fourth data transfer (22) can take place via a third communication channel (23) between the receiving device (21) and the first communication interface (4), wherein the fourth data transfer (22) can be unidirectional or bidirectional. To identify a user, a fifth data transfer (26) of identification data between the receiving device (21) and an identification device (24) can be initiated by means of a fourth communication channel (25) before the waste container (2) is used. Such an identification process is a so-called offline use of the waste container (2).

The waste container (2) may comprise at least one sensor device (27). A sixth data transfer (28) can take place via a fifth communication channel (29) between the at least one sensor device (27) and the first communication interface (4), wherein the sixth data transfer (28) may be unidirectional or bidirectional.

According to an embodiment, control data can be transmitted from the first communication interface (4) to at least one internal device (32) of the waste container (2) or to at least one external device (33) by means of a seventh data transfer (30). The seventh data transfer (30) takes place via a sixth communication channel (31) and can be unidirectional or bidirectional. The control data are generated at least partially by the control device (3) or at least partially by a sensor device (27). The at least one internal device (32) or the at least one external device (33) may be an actuator, a locking device, a display device, an output device or a fire extinguisher.

According to a further embodiment, the data transfer via the communication channels one to six (13, 17, 23, 25, 29) is based on wireless technology, wherein the wireless technology has a range of less than 300 m, preferably less than 100 m, preferably less than 50 m, preferably less than 30 m, preferably less than 10 m, preferably less than 5 m, preferably less than 3 m, preferably less than 1 m, particularly preferably less than 50 cm, wherein the wireless technology is selected from a group comprising NFC technology, RFID technology, WLAN technology, Bluetooth® technology and optical transmission technology.

According to a further embodiment, the data transfer between the third (8, 12) and the second communication interface (7) takes place via a seventh communication channel (34). The data transfer takes place between the fourth (9, 14) and the second communication interface (7) via an eighth communication channel (20). The seventh (34) and the eighth communication channel (20) are based at least partially on wireless technology with a maximum range of over 30 m, preferably over 100 m, preferably over 500 m, preferably over 1 km, more preferably several km, and a transmission technology, which is selected from a group comprising WLAN connection, wireless connection, mobile connection, 2G connection, 3G connection, GPRS connection, 4G connection, 5G connection.

According to a further embodiment, the further communication device (9, 11, 14) has a data processing device which is used to modulate data for transmission on different communication channels (13, 17, 34, 20) and/or for coding and/or for decoding the data received by the respective communication interfaces (4, 7, 8, 12, 15) before the data are forwarded to the respective other communication interface (4, 7, 8, 12, 15).

In the following, an overview is presented which lists the various communication channels, the data transfers and the communication interfaces (KS)/devices involved. Furthermore, the respective preferred transmission technology/wireless technology is specified.

| Communication channel | Data transfer | Participating communication interfaces (KS)/devices | Range of wireless technology |
|---|---|---|---|
| first (13) | first (10) | first KS (4)/ third KS (8, 12) | short |
| second (17) | first (10), second (18) | first KS (4)/ fourth KS (8, 15) | short |
| third (23) | fourth (22) | first KS (4)/ receiving device (21) | short |
| fourth (25) | fifth (25) | receiving device (21)/ identification device (24) | short |
| fifth (29) | sixth (28) | first KS (4)/ sensor device (27) | short |
| sixth (31) | seventh (30) | first KS (4)/ internal (32) or external device (33) | short |
| seventh (34) | first (10) | third KS (8, 12)/ second KS (7) | long |
| eighth (20) | first (10), third (19) | fourth KS (8, 15)/ second KS (7) | long |

The present invention can preferably solve the problem of the automatic unlocking request when the emptying vehicle approaches. Furthermore, persons without a smartphone can open the waste container (2). The advantageous use of a receiving device (21) can preferably be communicated to the control device via a radio link. Conventional RFID media, including RFID cards, key fobs, NFC units, can be used for communication with the receiving device. This additional receiving device (21) can also be used to identify persons with a smartphone for the opening, but not to transfer data to the host, if this is not desired. Advantageously, sensors (for example: level sensor, odour sensor, noise sensor, temperature sensor, acceleration sensor, voice sensor) can be integrated for transmitting information to the control device. Finally, the control device can advantageously evaluate this information and forward the information or control the corresponding actuators (e.g. block access). As a result, wired solutions can be avoided. Other sensors can be avoided which are necessary to detect emptying. Already known systems have the disadvantage that there is an additional cost of wiring and the installation situation of the components is limited. There is a high cost of software for emptying algorithms and the maintenance of the individual systems is time-consuming. A fully integrated digital waste disposal system is advantageously provided.

All the features disclosed in the application documents are claimed as being essential to the invention, provided that, individually or in combination, they are novel over the prior art.

LIST OF REFERENCE SIGNS

1 system
2 waste container
3 electronic control device
4 first communication interface
5 storage device
6 server
7 second communication interface
8 further communication interface
9 further communication device
10 first data transfer
11 first communication device
12 third communication interface
13 first communication channel
14 second communication device
15 fourth communication interface
16 display device
17 second communication channel
18 second data transfer
19 third data transfer
20 sixth communication channel
21 receiving device
22 fourth data transfer
23 third communication channel
24 identification device
25 fourth communication channel
26 fifth data transfer
27 sensor device
28 sixth data transfer
29 fifth communication channel
30 seventh data transfer
31 sixth communication channel
32 internal device
33 external device
34 seventh communication channel
35 authentication manager
36 database
37 data processing device

The invention claimed is:

1. A system, comprising:
a waste container including an electronic control device and at least one internal device;
a first communication interface for transmitting and receiving data;
a storage device; and
a server remote from the waste container and including a second communication interface,
wherein the control device stores usage data in the storage device after use of the waste container, wherein the first communication interface has no device for direct data transmission to the second communication interface, wherein an indirect first data transfer is initiable between at least one of the first communication interface and the second communication interface and between the second communication interface and the first communication interface via at least one further communication interface that is provided in a further communication device, wherein the further communication device is not associated with the waste container, wherein the stored usage data are transferable via the indirect first data transfer to the server, wherein at least the control device generates control data that are transferable to the at least one internal device through the first communication interface, wherein data included in the indirect first data transfer includes an access list comprising authorization data of users for an offline usage, wherein the access list is stored in the storage device for offline use, and wherein the offline use comprises a user identification between a receiving device capable of receiving identification data and an identification device.

2. The system of claim 1, further comprising:
a first communication device disposed in an emptying or service vehicle and comprising a third communication interface capable of performing the indirect first data transfer, wherein the indirect first data transfer between the first and the third communication interface takes place via a first communication channel.

3. The system of claim 1, further comprising:
a portable data processing device assigned to a user and comprising a third communication interface capable of performing the indirect first data transfer, wherein the transfer of data between the first and the third communication interface takes place via a first communication channel.

4. The system of claim 1, wherein, for identifying a user before the use of the waste container, a second data transfer is initiable between the first communication interface and a third communication interface and a subsequent third data transfer is initiable between the third communication interface and the second communication interface of the server, wherein the second data transfer between the first communication interface and the third communication interface takes place via a first communication channel, and wherein the third data transfer between the third communication interface and the second communication interface takes place via an a second communication channel.

5. The system of claim 1, wherein the waste container comprises the receiving device, wherein a third data transfer takes place via a first communication channel between the receiving device and the first communication interface, wherein the third data transfer is unidirectional or bidirectional, and wherein, before a use of the waste container, the identification data for identifying a user is sent as a fourth data transfer between the receiving device and the identification device by a second communication channel.

6. The system of claim 1, wherein the waste container comprises at least one sensor device, wherein a third data transfer takes place via a first communication channel between the at least one sensor device and the first communication interface, and wherein the third data transfer is unidirectional or bidirectional.

7. The system of claim 1, wherein the control data are further transferable to at least one external device from the first communication interface by a second data transfer, wherein the second data transfer takes place via a first communication channel and is unidirectional or bidirectional, wherein the control data are further generated at least partially by a sensor device, and wherein the at least one internal device or the at least one external device is an actuator, a locking device, a display device, an output device or a fire extinguisher.

8. The system of claim 2, wherein the indirect first data transfer via the first communication channel is based on wireless technology, wherein the wireless technology has a range below 50 cm, and wherein the wireless technology is selected from a group comprising a near field communication (NFC) technology, a radio-frequency identification (RFID) technology, a wireless-local area network (WLAN) technology, a device pairing technology, and an optical transmission technology.

9. The system of claim 2, wherein the data transfer between a third communication interface and the second communication interface takes place via a seventh communication channel, wherein a second data transfer takes place between a fourth communication interface and the second communication interface via a second communication channel, wherein the second communication channel is based at least partially on a wireless technology with a maximum range of over 1 kilometer (km), and wherein the wireless technology is based on a transmission technology selected from a group comprising a wireless-local area network (WLAN) connection, a wireless connection, a mobile connection, a 2G connection, a 3G connection, a general packet radio service (GPRS) connection, a 4G connection, and a 5G connection.

10. The system of claim 1, wherein the further communication device has a data processing device which is used for modulation of data for transmission on different communication channels and/or for a coding and/or for a decoding of the data received by the first communication interface or the second communication interface before the data are forwarded to the second communication interface or the first communication interface, respectively.

11. A method for data transmission between a waste container which has an electronic control device and at least one internal device, a first communication interface for transmitting and receiving data, a storage device, and a server remote from the waste container and having a second communication interface, the method comprising the steps of:
    establishing a data connection by a communication channel between the first communication interface and a further communication interface of a further communication device that is not part of the waste container;
    authorizing the data connection;
    generating, by at least the electronic control device, control data;
    initiating an indirect first data transfer between at least one of the first communication interface and the second communication interface and between the second communication interface and the first communication interface via the further communication interface; and
    initiating a second data transfer of the control data from the electronic control device to the at least one internal device through the first communication interface,
    wherein data included in the indirect first data transfer includes an access list comprising authorization data of users for offline usage, wherein the access list is stored in the storage device for offline use, and wherein the offline use comprises a user identification between a receiving device capable of receiving identification data of a user and an identification device.

12. The method of claim 11, wherein the indirect first data transfer occurs on a first communication channel between the first communication interface and a third communication interface of a first communication device disposed in an emptying or service vehicle.

13. The method of claim 12, wherein a third indirect data transfer further occurs on a second communication channel between the first communication interface and a fourth communication interface of a portable data processing device assigned to the user.

14. The method of claim 12, wherein the indirect first data transfer is based on a wireless technology, wherein the wireless technology has a range below 50 cm, and wherein the wireless technology is selected from a group comprising a near field communication (NFC) technology, a radio-frequency identification (RFID) technology, a wireless-local area network (WLAN) technology, a device pairing technology, and an optical transmission technology.

15. The method of claim 13, wherein the first communication channel and the second communication channel are based at least partially on wireless technology with a maximum range of over 1 kilometer (km), and a transmission technology selected from a group comprising a wireless-local area network (WLAN) connection, a wireless connection, a mobile connection, a 2G connection, a 3G connection, a general packet radio service (GPRS) connection, a 4G connection, and a 5G connection.

16. The system of claim 3, wherein the portable data processing device comprises a mobile phone, a smartphone, a tablet, or a laptop.

17. The method of claim 13, wherein the portable data processing device comprises a mobile phone, a smartphone, a tablet, or a laptop.

* * * * *